(12) United States Patent
Uchiyama et al.

(10) Patent No.: US 7,708,662 B2
(45) Date of Patent: May 4, 2010

(54) VEHICLE APPARATUS HAVING A CHAIN GUIDE DEVICE

(75) Inventors: Mikio Uchiyama, Wako (JP); Kazuhiko Gogo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/496,244

(22) Filed: Jul. 31, 2006

(65) Prior Publication Data

US 2007/0032324 A1 Feb. 8, 2007

(30) Foreign Application Priority Data

Aug. 4, 2005 (JP) ............................. 2005-227254

(51) Int. Cl.
*F16H 7/18* (2006.01)
(52) U.S. Cl. ...................................... 474/144; 474/140
(58) Field of Classification Search ................ 474/140, 474/144, 145, 146, 147
See application file for complete search history.

(56) References Cited

U.S. PATENT DOCUMENTS

| 4,471,851 | A | * | 9/1984 | Kamiya et al. ............... 180/219 |
| 5,679,084 | A | * | 10/1997 | Daniels, III .................. 474/140 |
| 2002/0160869 | A1 | * | 10/2002 | Barnett ........................ 474/144 |
| 2005/0159260 | A1 | * | 7/2005 | Gogo ........................... 474/111 |
| 2007/0087877 | A1 | * | 4/2007 | McGarry ...................... 474/144 |

FOREIGN PATENT DOCUMENTS

| JP | 3-5588 | | 1/1991 |
| JP | UM-B-5-20637 | * | 5/1993 |

* cited by examiner

*Primary Examiner*—Bradley T King
*Assistant Examiner*—Thomas Irvin
(74) *Attorney, Agent, or Firm*—Hamre, Schumann, Mueller & Larson, P.C.

(57) ABSTRACT

Vehicle apparatus for a vehicle including a chain guide device which can be easily mounted to the vehicle with a reduced number of parts. The chain, guide device for guiding a chain in the vehicle includes a main frame and a rear swing arm extending rearward from the main frame. The chain guide device also includes a stay extending downward from the rear swing arm, a sectionally U-shaped plate member fastened to the stay using fastening members, and a chain guide member mounted in the plate member. The chain guide member has a chain guide hole through which the chain passes through to be guided. The chain guide member is fixed by fitting the lower surface and the right and left side surfaces of the chain guide member to the plate member and by fitting the upper surface of the chain guide member to the stay.

4 Claims, 6 Drawing Sheets

VEHICLE APPARATUS HAVING A CHAIN GUIDE DEVICE

FIELD

The present invention relates to vehicle apparatus including a chain guide device provided on a rear swing arm for guiding a chain wrapped between a drive sprocket mounted to an engine and a rear sprocket mounted to a rear wheel.

BACKGROUND

Conventionally, a chain guide device is provided on a rear swing arm for guiding a chain wrapped between a drive sprocket mounted to an engine and a rear sprocket mounted to a rear wheel. The chain guide device includes a guide plate member formed of metal and a chain guide member formed of resin, whereby the chain guide member is surrounded and held by the guide plate member.

FIG. 4 of published patent application Japanese Utility Model Laid-open No. 3-5588 discloses a sectional view of a chain guide device 18 (reference numerals cited herein are those shown in the above mentioned publication). This chain guide device 18 includes a stay 41 with a forked shape and a lower opening provided on a rear fork 9, a sectionally U-shaped chain guide plate 42 (hereinafter referred to as plate member 42) connected to the stay 41 forming a ringlike portion, and a chain guide member 43 surrounded and held by the ringlike portion.

The plate member 42 and the chain guide member 43 are fastened together to the stay 41 by using a bolt 45 and a nut 46.

However, since the stay 41 is a forked member with a lower opening, a collar 43d that prevents the deformation of the stay 41 while securing the nut 46 to the bolt 45 is required. This results in an increase in number of parts required and an increase in weight.

Further, fastening the chain guide member 43 and the plate member 42 to the stay 41 using the bolt 45 and the nut 46 requires three types of insertion holes and a total of five holes. They include an insertion hole (axial hole) of the collar 43d fitted with a collar insertion hole h of the chain guide member 43, two insertion holes of the plate member 42, and two insertion holes of the stay 41. Accordingly, in integrating the chain guide device 18 with the rear fork 9, these five insertion holes must be aligned, such that mounting the chain guide device 18 to the rear fork 9 is troublesome.

BRIEF SUMMARY

It is accordingly an object of the present invention to provide vehicle apparatus for a vehicle including a chain guide device which can be easily mounted to the vehicle with a reduced number of parts.

A chain guide device for guiding a chain wrapped between a chive sprocket mounted to an engine and a rear sprocket mounted to a rear wheel of the vehicle having a main frame and a rear swing arm extending rearward from the main frame is provided. The vehicle apparatus includes a stay extending downward from the rear swing arm, and the chain guide device includes a sectionally U-shaped plate member fastened to the stay by a fastening member and a chain guide member mounted in the plate member, wherein the chain guide member has a chain guide hole through which the chain passes through to be guided The chain guide member is fixed by fitting the lower surface and the right and left side surfaces of the chain guide member to the plate member and fitting the upper surface of the chain guide member to the stay.

Accordingly, any fastening members for fixing the chain guide member to the stay are not required. Since no fastening members are required for the chain guide member, any collars for preventing the deformation of the stay are also not required, thereby reducing the number of parts and a reduction in weight.

Further, in mounting the chain guide device to the rear swing arm, the holes to be aligned for the insertion of a bolt as the fastening member require only two types of insertion holes including insertion holes of the plate member and insertion holes of the stay. Since only two types of holes need to be aligned, the chain guide device is easily mounted to the rear swing arm. As a result, the mounting workability for the chain guide device is improved.

The chain guide member has a stopper portion for stopping the movement of the chain guide member in its longitudinal direction.

The stopper portion includes a first stopper portion for stopping the rearward movement of the chain guide member and a second stopper portion for stopping the frontward movement of the chain guide member.

The first stopper portion includes a flange portion formed at the front end of the chain guide member, the flange portion being in contact with the front end portion of the plate member.

The second stopper portion includes a ridge portion formed at the upper portion of the chain guide member so as to increase in height toward the rear end thereof, with the ridge portion being fitted to the stay.

The ridge portion has a hollow structure.

The second stopper portion includes a projection formed at the upper portion of the chain guide member, with the projection abutting against the rear surface of the stay.

The chain guide member has the stopper portion for preventing movement of the chain guide member in its longitudinal direction. For example, the stopper portion of the chain guide member is fitted to the plate member and the stay in the longitudinal direction of the chain guide member, so that the chain guide member can be fixed more reliably.

The stopper portion is composed of the first stopper portion for preventing the rearward movement of the chain guide member and the second stopper portion for preventing the frontward movement of the chain guide member. Thus, the stopper portion is composed of separate portions, so that the chain guide member can be fixed more reliably.

In mounting the chain guide member and the plate member to the stay, the plate member is first fitted to the chain guide member so as to abut against the first stopper portion, thereby integrating the plate member and the chain guide member. Thereafter, the second stopper portion of the chain guide member is fitted to the stay so that the chain guide member is sandwiched between the stay and the plate member in the longitudinal direction of the chain guide member. In this condition, the plate member is fixed to the stay by using the fastening member. Accordingly, the positioning of the chain guide member to the stay can be easily effected.

As a result, the mounting workability for the chain guide member is improved.

The first stopper portion is provided by the flange portion formed at the front end of the chain guide member, with the flange portion in contact with the front end portion of the plate member. Accordingly, direct contact of the chain and the plate member can be reduced.

Since direct contact of the chain and the plate member can be reduced as mentioned above, the service life of the plate member can be extended.

The second stopper portion is provided by the ridge portion formed at the upper portion of the chain guide member so as to increase in height toward the rear end thereof, with the ridge portion fitted to the stay. Accordingly, the frontward movement of the chain guide member from the plate member can be prevented with a simple structure.

The ridge portion has a hollow structure. With this structure, vibrations generated by possible contact of the chain and the chain guide member can be easily absorbed, so that the transmission of the vibrations to the rear swing arm can be suppressed.

The second stopper portion is provided by the projection formed at the upper portion of the chain guide member, and this projection abuts against the rear surface of the stay. Accordingly, the frontward movement of the chain guide member from the plate member can be prevented with a simple structure.

DETAILED DESCRIPTION

Figure 1:
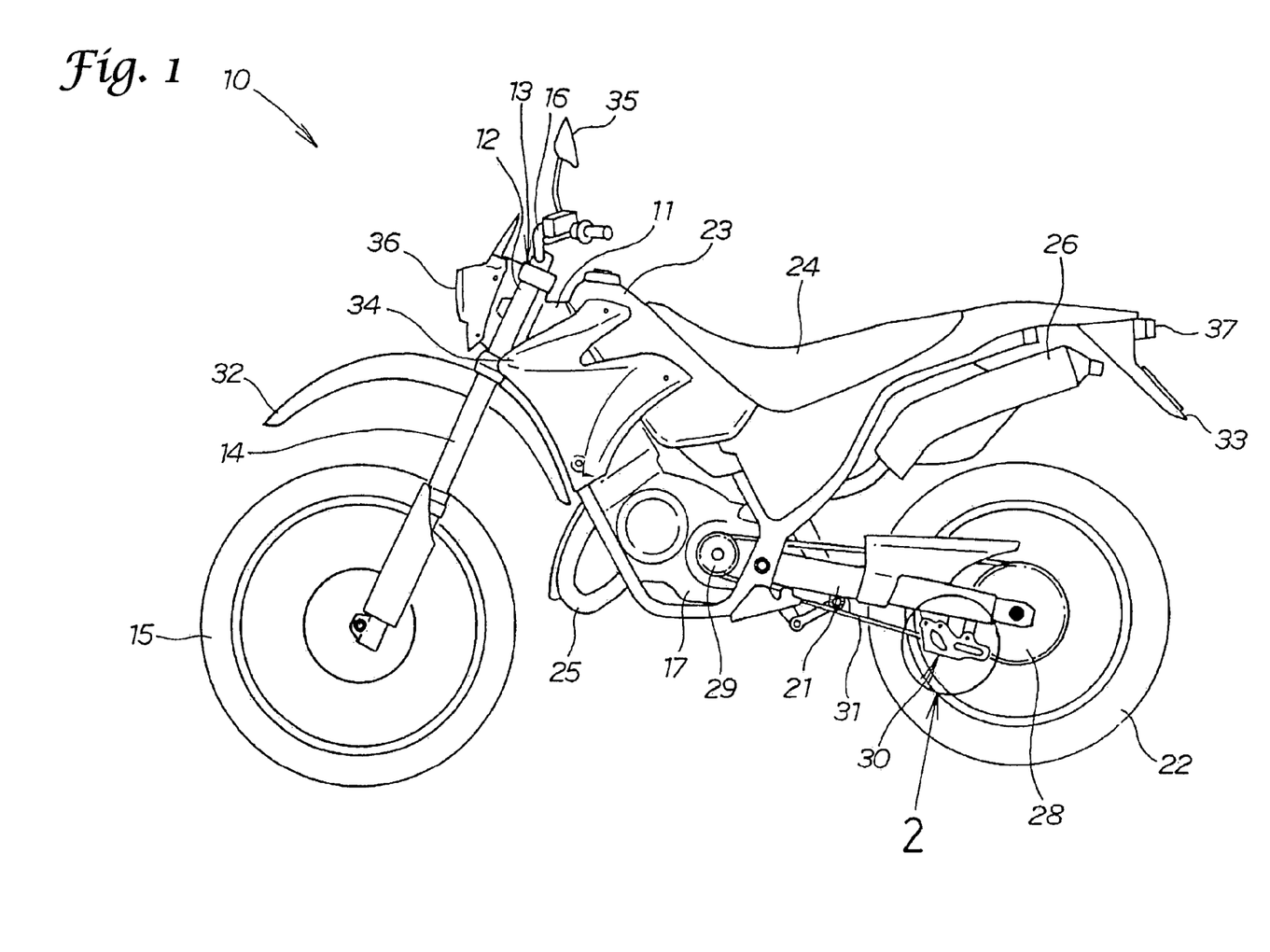
FIG. 1 is a side view of a motorcycle according to the present invention.

An embodiment of the present invention will now be described with reference to the attached drawings. Each drawing is to be viewed in the same direction as that of reference numerals included therein. FIG. 1 is a side view of a motorcycle 10 according to the present invention. The motorcycle 10 includes a main frame 11, a head pipe 12 mounted to the front end of the main frame 11, a steering frame 13 steerably mounted to the head pipe 12, a front fork 14 mounted to a lower portion of the steering frame 13, a front wheel 15 rotatably mounted to a lower end portion of the front fork 14, a steering handle 16 mounted to an upper portion of the steering frame 13 for steering the front wheel 15, an engine 17 mounted to the main frame 11, a rear swing arm 21 vertically swingably mounted to the main frame 11, a rear wheel 22 rotatably mounted to a rear end portion of the rear swing arm 21, a fuel tank 23 mounted to an upper portion of the main frame 11, a rider seat 24 mounted to the main frame 11 on the rear side of the fuel tank 23, an exhaust pipe 25 mounted to the engine 17, and a muffler 26 mounted to a rear portion of the exhaust pipe 25.

A rear sprocket 28 is fixed to the rear wheel 22, and a drive sprocket 29 is mounted to an output shaft connected to the engine 17. A chain 31 is wrapped around the rear sprocket 28 and the drive sprocket 29. A chain guide device 30 for guiding the chain 31 is mounted on the rear swing arm 21 extending rearward from the main frame 11.

Thus, the chain guide device 30 is mounted on the rear swing arm 21 extending rearward from the main frame 11, so as to guide the chain 31 wrapped around the drive sprocket 29, mounted to the engine 17, and the rear sprocket 28, mounted to the rear wheel 22.

The motorcycle 10 further includes a front fender 32, rear fender 33, cowl member 34, mirror 35, head lamp 36, and tail lamp 137.

Figure 2:
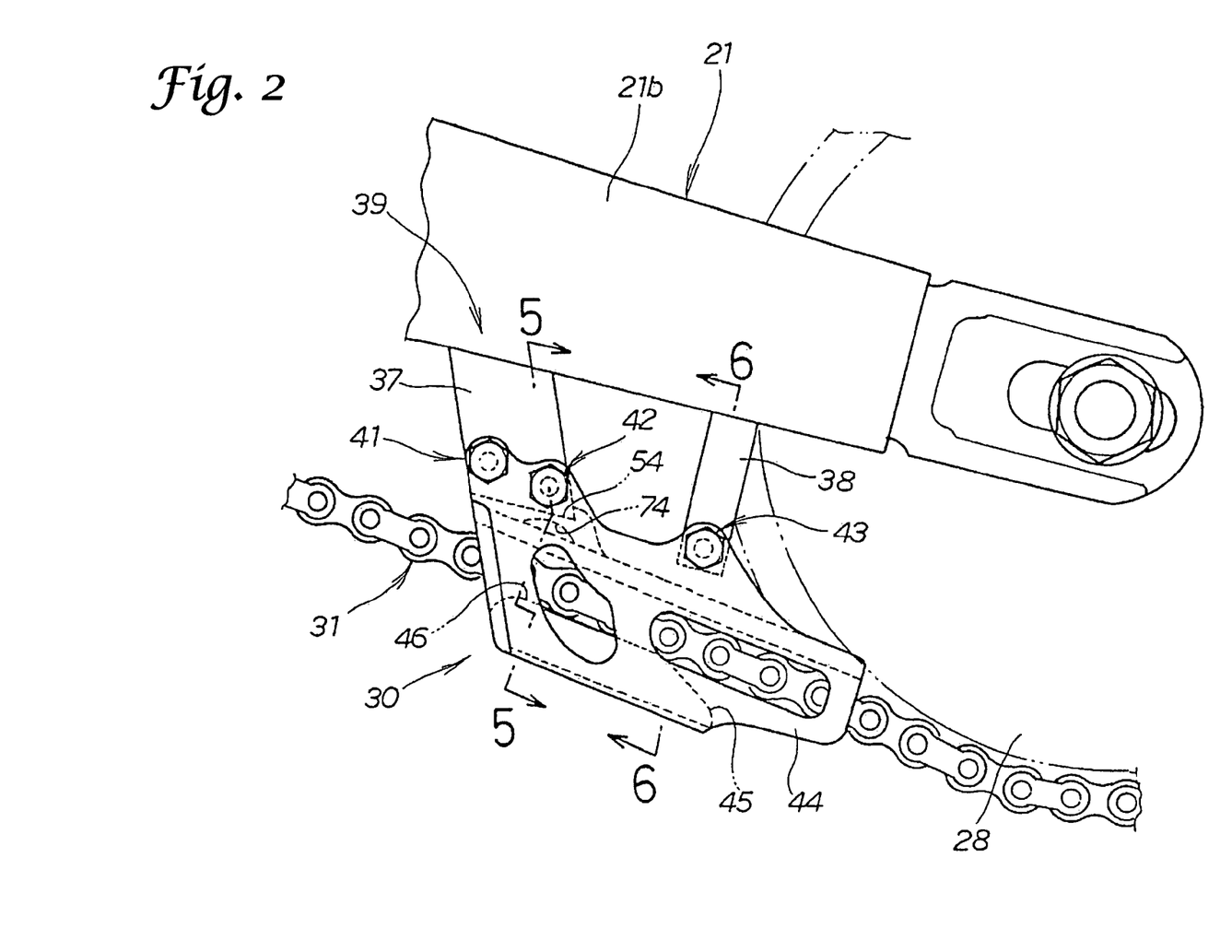
FIG. 2 is an enlarged view of an encircled portion 2 in FIG. 1.

FIG. 2 is an enlarged view of an encircled portion 2 in FIG. 1. As shown in FIG. 2, the vehicle apparatus of the present invention is composed of a front stay 37 extending downward from a rear end portion 21b of the rear swing arm 21, a rear stay 38 extending downward from the rear end portion 21b at a position behind the front stay 37, and the chain guide device. The chain guide device 30 includes a sectionally U-shaped plate member 44 mounted through a plurality of fastening members 41, 42, and 43 to the front and rear stays 37 and 38, and a chain guide member 45 provided inside of the plate member 44 to guide the chain 31. The front and rear stays 37 and 38 constitute a stay 39.

Thus, the vehicle apparatus includes the stay 39 extending downward from the rear swing arm 21, and the plate member 44 fastened to the stay 39 by the fastening members 41, 42, and 43. The chain guide member 45 is mounted in the plate member 44, and has a chain guide hole 46 through which the chain 31 passes through to be guided.

Figure 3:
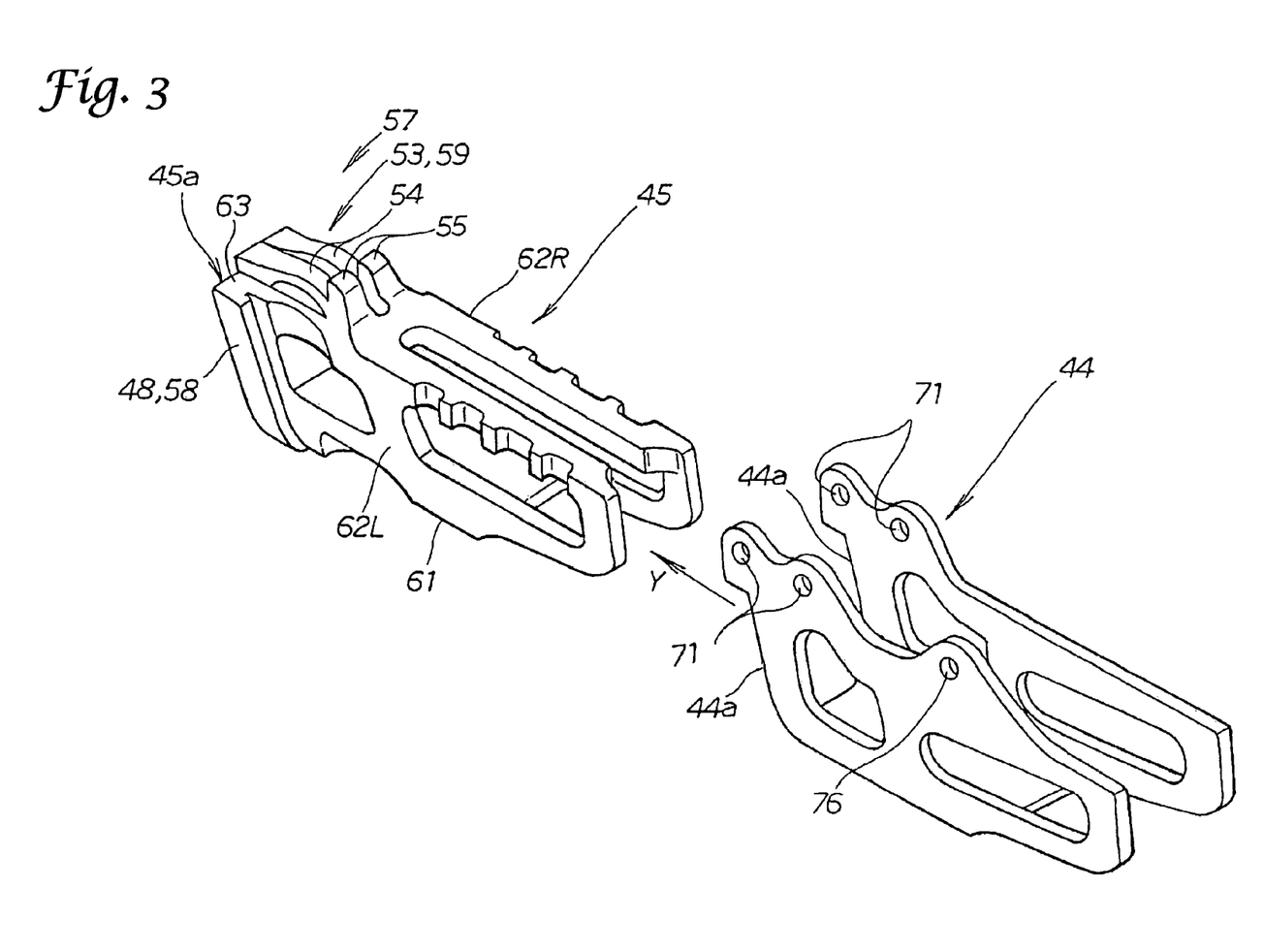
FIG. 3 is a perspective view of a chain guide member and a plate member of a chain guide device according to the present invention, illustrating the mounting of the plate member to the chain guide member.

FIG. 3 is a perspective view of the chain guide member 45 and the plate member 44 of the chain guide device 30, illustrating the mounting of the plate member 44 to the chain guide member 45.

The chain guide member 45 has a front end 45a projecting on the right and left sides and the lower side to form a flange portion 48, and further has an upper surface 63 formed with a ridge portion 53 increased in height toward the rear end thereof. The ridge portion 53 is composed of a gradually raised portion 54 and a sudden projection 55 formed behind the gradually raised portion 54. The sudden projection 55 has a height larger than that of the gradually raised portion 54 so as to provide a given height difference.

The mounting of the plate member 44 to the chain guide member 45 is achieved by moving the plate member 44 toward the chain guide member 45 in the direction shown by an arrow Y until a front end portion 44a of the plate member 44 abuts against the flange portion 48 of the chain guide member 45.

In this mounted condition, the chain guide member 45 is fixed in the sectionally U-shaped plate member 44 by fitting the lower surface 61 and the right and left side surfaces 62R and 62L of the chain guide member 45 to the inside surface of the plate member 44.

A first stopper portion 58 for stopping the rearward movement and disengagement of the chain guide member 45 from the plate member 44 is provided by placing flange portion 48, formed at the front end 45a of the chain guide member 45, in contact with the front end portion 44a of the plate member 44.

Thus, the first stopper portion 58 is provided when the flange portion 48, formed at the front end 45a of the chain guide member 45, is in contact with the front end portion 44a of the plate member 44. Accordingly, direct contact of the chain 31 and the plate member 44 can be reduced.

Since direct contact of the chain 31 and the plate member 44 can be reduced as mentioned above, the service life of the plate member 44 can be extended.

The assembly of the chain guide member 45 and the plate member 44 will be hereinafter referred to as a chain guide unit 64.

Figure 4:
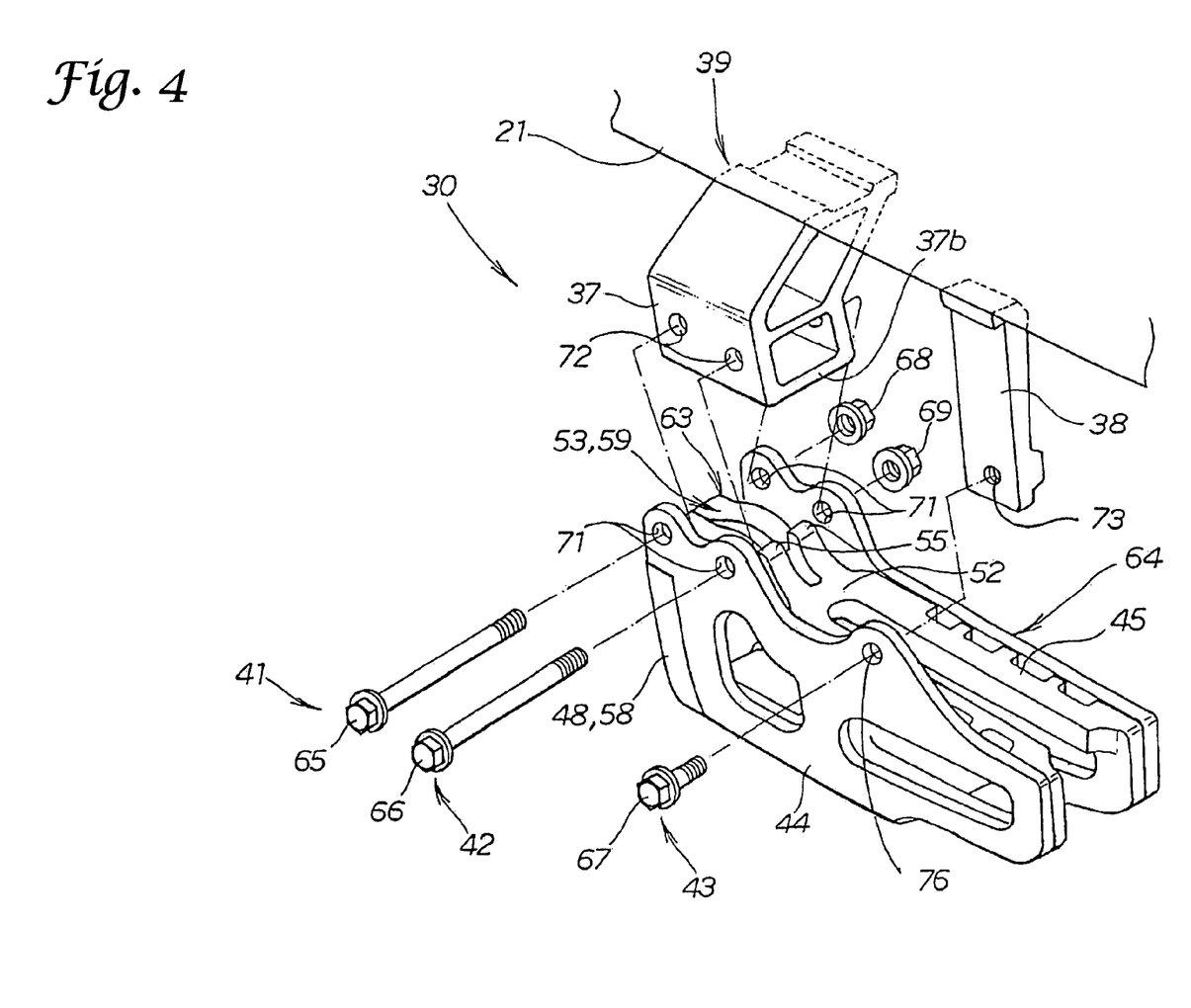
FIG. 4 is an exploded perspective view of the chain guide device, illustrating the mounting of a chain guide unit to a stay.

FIG. 4 is an exploded perspective view of the vehicle apparatus illustrating the mounting of the chain guide unit 64 to the stay 39.

As shown in FIG. 4, the vehicle apparatus includes the stay 39, composed of the front-stay 37 and the rear stay 38, extending downward from the rear swing arm 21, the chain guide unit 64, composed of the sectionally U-shaped plate member 44 mounted to the stay 39, the chain guide member 45, fixedly mounted in the plate member 44, and the fastening members 41, 42, and 43 for fastening the plate member 44 to stay 39. The fastening member 41 is composed of a bolt 65 and a nut 68 mated with the bolt 65. The fastening member 42 is composed of a bolt 66 and a nut 69 mated with the bolt 66. The fastening member 43 is provided by a bolt 67 adapted to be threadedly engaged with a tapped hole 73 formed through the rear stay 38. The chain 31 is not shown in FIG. 4.

In mounting the chain guide unit 64 to the stay 39, the front surface of the projection 55 of the ridge portion 53, formed on the upper surface 63 of the chain guide member 45, abuts against the rear surface 37b of the front stay 37. In this condition, insertion holes 71, formed through the plate member 44, are aligned to insertion holes 72, formed through the front stay 37, and an insertion hole 76, formed through the plate member 44, is aligned to the tapped hole 73 of the rear stay 38. In this condition, the bolts 65 and 66 are inserted through the insertion holes 71, of the plate member 44, and the insertion holes 72, of the front stay 37. The nuts 68 and 69 are then secured to the bolts 65 and 66, respectively. Further, the bolt 67 is engaged into the tapped hole 73 of the rear stay 38.

A second stopper portion 59 for stopping the frontward movement and disengagement of the chain guide member 45 from the plate member 44 is provided by the ridge portion 53, formed at the upper portion 52 of the chain guide member 45, so as to be increased in height toward the rear end thereof. As the chain guide unit 64 is mounted to the stay 39, the ridge portion 53 of the chain guide member 45 is fitted to the front stay 37 as a part of the stay 39, so that the frontward movement of the chain guide member 45 is prevented by the abutment of the ridge portion 53 against the front stay 37.

Thus, the second stopper portion 59 is provided by the ridge portion 53, formed at the upper portion 52 of the chain guide member 45, so as to increase the height toward the rear end thereof. Accordingly, the frontward movement of the chain guide member 45 from the plate member 44 can be prevented with a simple structure.

As shown in FIG. 3, the first stopper portion 58 and the second stopper portion 59 constitute a stopper portion 57 for stopping the movement of the chain guide member 45 in its longitudinal direction. Thus, the stopper portion 57 of the chain guide member 45 can be fitted to the plate member 44 and the stay 39. Since the stopper portion 57 of the chain guide member 45 can be fitted to the plate member 44 and the stay 39, the movement of the chain guide member 45 in its longitudinal direction can be prevented.

Thus, the stopper portion 57 is composed of the first stopper portion 58, for stopping the rearward movement of the chain guide member 45 from the plate member 44, and the second stopper portion 59, for stopping the frontward movement of the chain guide member 45 from the plate member 44. In other words, prevention of movement of the chain guide member 45 in its longitudinal direction is effected at two positions, so that the chain guide member 45 can be reliably fixed by the plate member 44 and the stay 39.

Figure 5:
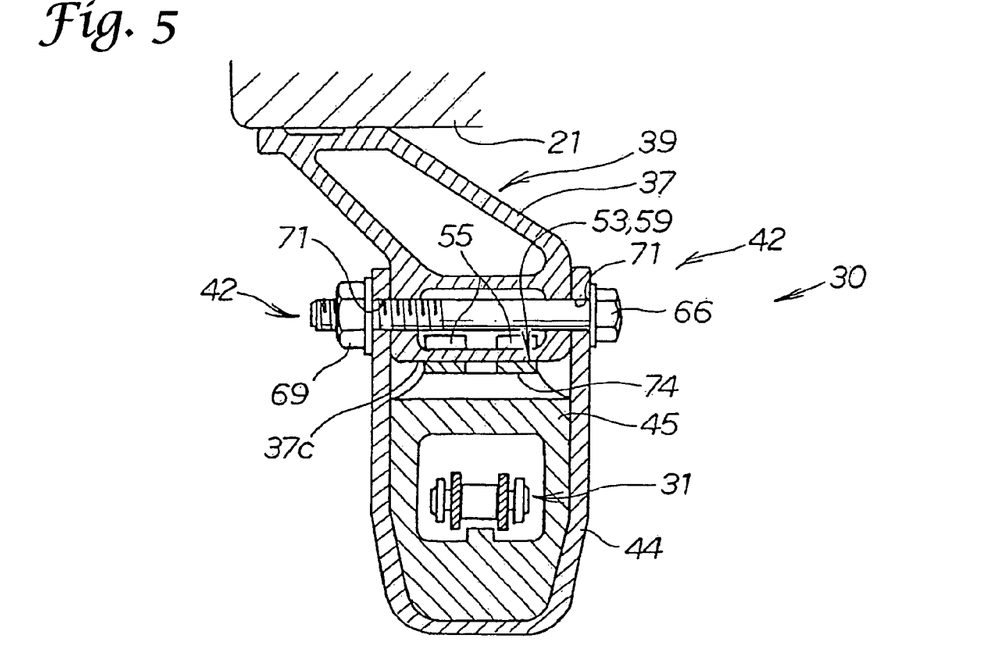
FIG. 5 is a cross section taken along the line 5-5 in FIG. 2.

FIG. 5 is a cross section taken along the line 5-5 in FIG. 2, illustrating the positional relation between the ridge portion 53, as the second stopper portion for stopping the frontward movement of the chain guide member 45, and the front stay 37, as a part of the stay 39.

As shown in FIG. 5, the projection 55, as a part of the ridge portion 53, projects upward from the upper portion 52, of the chain guide member 45, to a vertical position higher than that of the lower surface 37c of the front stay 37 as a part of the stay 39.

The gradually raised portion 54 (see FIG. 2), as a part of the ridge portion 53, is formed with a hollow portion 74, thus having a hollow structure. Since the ridge portion 53 has the hollow portion 74, vibrations generated by possible contact of the chain 31 and the chain guide member 45 can be easily absorbed, so that the transmission of the vibrations to the rear swing arm 21 can be suppressed.

Figure 6:
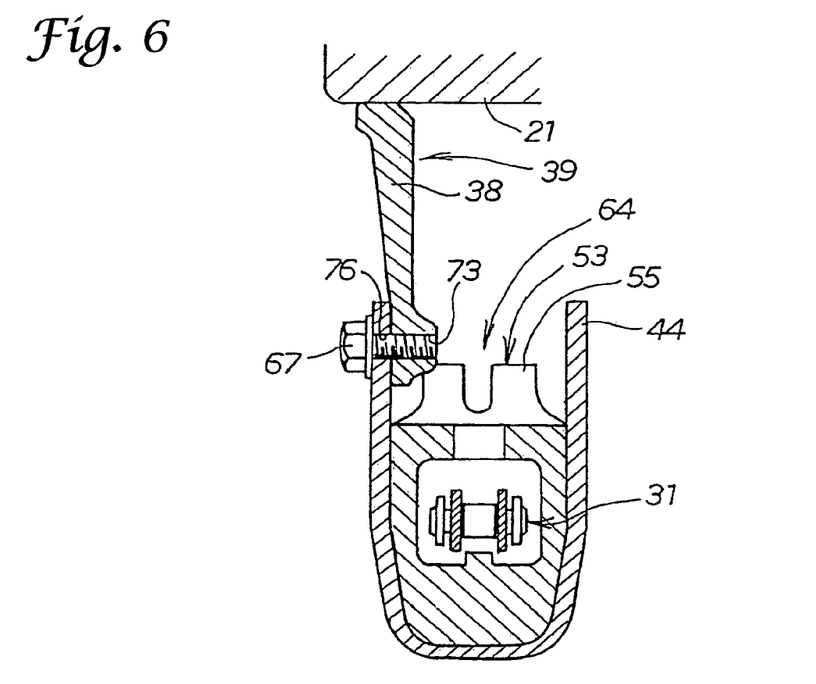
FIG. 6 is a cross section taken along the line 6-6 in FIG. 2.

FIG. 6 is a cross section taken along the line 6-6 in FIG. 2, showing that the insertion hole 76, of the plate member 44, is aligned to the tapped hole 73, of the rear stay 38, as a part of the stay 39 and that the chain guide unit 64 is fixed to the rear stay 38 by the bolt 67 inserted through the insertion hole 76 and engaged with the tapped hole 73.

Figure 7A:
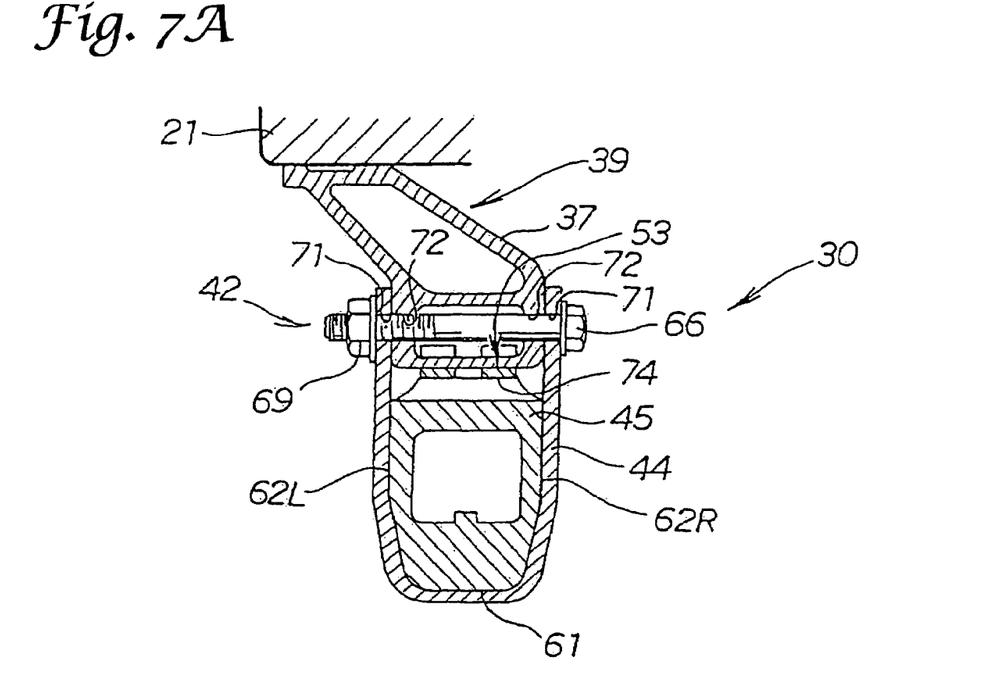
FIG. 7A is a sectional view illustrating the chain guide device according to the present invention.
Figure 7B:
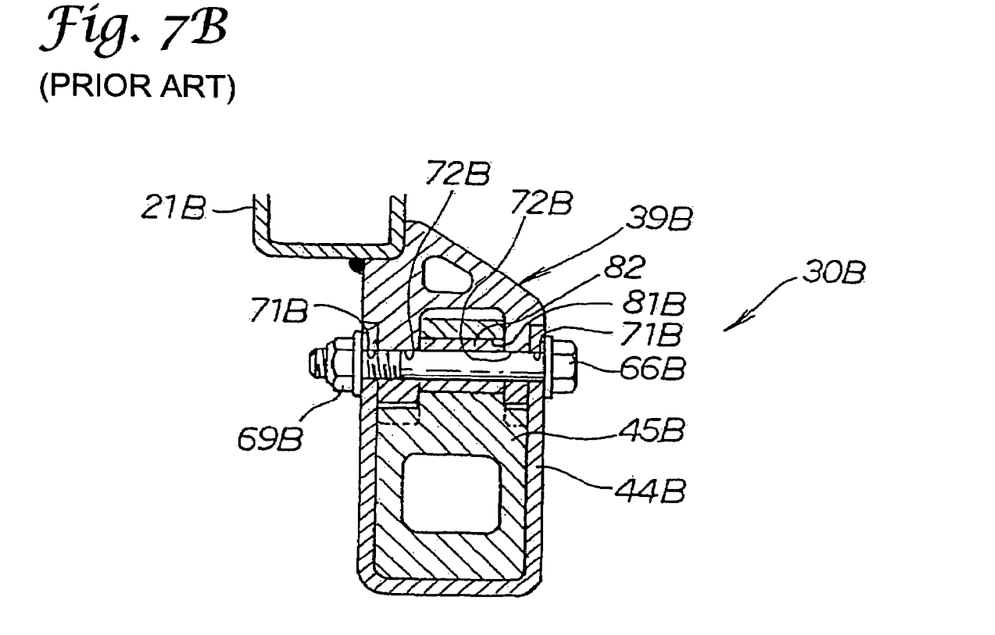
FIG. 7B is a sectional view illustrating a prior art chain guide device as a comparison.

The operation of the chain guide device 30 will now be described with reference to FIGS. 7A and 7B FIG. 7A is a sectional view illustrating the chain guide device 30 according to the present invention, and FIG. 7B is a sectional view illustrating a prior art chain guide device 30B as a comparison.

As shown in FIG. 7A, the lower surface 61 and the right and left side surfaces 62R and 62L of the chain guide member 45 are fitted to the inside surface of the sectionally U-shaped plate member 44, and the ridge portion 53, formed at the upper portion 52 of the chain guide member 45, is fitted to the stay 39. Thus, the chain guide member 45 is fixed by the plate member 44 and the stay 39. Further, the bolt 66 and the nut 69 constitute the fastening member 42 for fixing the plate member 44 to the stay 39. In other words, the fastening member 42 does not fasten the chain guide member 45 to the stay 39.

Accordingly, the use of fastening members for fixing the chain guide member 45 to the stay 39 are not required. Since no fastening members are required for fixing the chain guide member 45 to the stay 39, the use of collars for preventing the deformation of the stay 39 are not required, thereby reducing the number of parts and a reduction in weight.

Further, in integrating the chain guide device 30 with the rear swing arm 21, only two kinds of insertion holes need to be aligned for the insertion of the bolt 66; the insertion holes 71 of the plate member 44 and the insertion holes 72 of the stay 39. Accordingly, the chain guide device 30 can be easily mounted to the rear swing arm 21.

As a result, the mounting workability for the chain guide device 30 can be improved.

As shown in FIG. 7B, according to the prior art, a chain guide member 45B is surrounded by a forked stay 39B with a lower opening and a sectionally U-shaped plate member 44B. A collar 82 that prevents the deformation of the stay 39B is fitted with a collar insertion hole 81B formed through the chain guide member 45B. Further, the collar 82, the plate member 44B, and the stay 39B are fixed together by using a bolt 66B and a nut 69B as a fastening member.

Thus, the fastening member is required for fixation of the chain guide member 45B. In addition, the collar 82 is an essential member.

In integrating the chain guide device 30B with a rear swing arm 21B, there are three kinds of insertion holes that need to be aligned for the insertion of the bolt 66B including insertion holes 71B of the plate member 44B, insertion holes 72B of the stay 39B, and an insertion hole (axial hole) of the collar 82 fitted with the collar insertion hole 81B of the chain guide member 45B. Accordingly, the mounting work for the chain guide device 30B to the rear swing arm 21B is troublesome.

The chain guide device of the present invention is suitable for a motorcycle. While the present invention is applied to a motorcycle as in the above preferred embodiment, the present invention is applicable also to a three-wheeled vehicle and any other general vehicles.

The invention claimed is:

1. Vehicle apparatus in a vehicle having a chain wrapped between a drive sprocket mounted to an engine and a rear sprocket mounted to a rear wheel, said vehicle having a main frame and a rear swing arm extending rearward from said main frame, said vehicle apparatus comprising a chain guide device for guiding said chain and a stay extending downward from said rear swing arm, said stay having a downwardly-facing, bottom surface, said chain guide device comprising:
    a sectionally U-shaped plate member fastened to said stay with a fastening member; and
    a chain guide member mounted in said plate member, said chain guide member having a chain guide hole through which said chain is passed, said chain guide member having lower and upper surfaces and right and left side surfaces;
    said chain guide member fitting the lower surface and the right and left side surfaces of said chain guide member to said plate member, said chain guide member having an upwardly-facing, upper surface fitting so as to make contact between a portion of the upwardly-facing, upper surface of said chain guide member and a portion of the downwardly-facing, bottom surface of said stay, and
    said fastening member fastening said plate member of said chain guide device to said stay, whereby said chain guide member being fitted to said stay through said plate member and without being fastened by said fastening member,
    said chain guide member has a stopper portion for stopping movement of said chain guide member in its longitudinal direction,
    said stopper portion comprises a first stopper portion for stopping rearward movement of said chain guide member and a second stopper portion for stopping frontward movement of said chain guide member, and
    said chain guide member has a front end and said plate member has a front end portion, said first stopper portion comprising a flange portion formed at the front end of said chain guide member, said flange portion being in contact with the front end portion of said plate member, and
    wherein, upon assembly of the chain guide device, said first stopper portion has a part that is disposed below said chain.

2. The vehicle apparatus according to claim 1, wherein said chain guide member has an upper portion and a rear end, said second stopper portion comprising a ridge portion formed at the upper portion of said chain guide member so as to be increased in height toward the rear end thereof, said ridge portion being fitted to said stay.

3. The vehicle apparatus according to claim 2, wherein said ridge portion has a hollow structure.

4. The vehicle apparatus according to claim 1, wherein said chain guide member has an upper portion and said stay has a rear surface, said second stopper portion comprising a projection formed at the upper portion of said chain guide member, said projection abutting against the rear surface of said stay.

* * * * *